United States Patent
Shinde et al.

(10) Patent No.: US 10,795,690 B2
(45) Date of Patent: Oct. 6, 2020

(54) AUTOMATED MECHANISMS FOR ENSURING CORRECTNESS OF EVOLVING DATACENTER CONFIGURATIONS

(71) Applicant: Oracle International Corporation, Redwood Shores, CA (US)

(72) Inventors: Pravin Shinde, Zurich (CH); Felix Schmidt, Niederweningen (CH); Craig Schelp, Surrey (CA)

(73) Assignee: Oracle International Corporation, Redwood Shores, CA (US)

( * ) Notice: Subject to any disclaimer, the term of this patent is extended or adjusted under 35 U.S.C. 154(b) by 133 days.

(21) Appl. No.: 16/174,582

(22) Filed: Oct. 30, 2018

(65) Prior Publication Data

US 2020/0133688 A1 Apr. 30, 2020

(51) Int. Cl.
*G06F 9/44* (2018.01)
*G06F 9/445* (2018.01)
*G06F 16/901* (2019.01)

(52) U.S. Cl.
CPC ...... *G06F 9/44505* (2013.01); *G06F 16/9024* (2019.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 6,047,274 A * | 4/2000 | Johnson | G06Q 10/04 705/412 |
| 6,782,394 B1 | 8/2004 | Landeck | |
| 7,555,710 B2 | 6/2009 | Kobashi | |
| 7,644,051 B1 * | 1/2010 | Moore | G05B 13/027 706/21 |
| 8,145,641 B2 | 3/2012 | Chatterjee | |
| 8,352,453 B2 | 1/2013 | Chatterjee | |

(Continued)

OTHER PUBLICATIONS

Shinde et al., "Intelligent NIC Queue Management in the Dragonet Network Stack", dated 2015, 2 pages.

(Continued)

*Primary Examiner* — Phil K Nguyen
(74) *Attorney, Agent, or Firm* — Hickman Palermo Becker Bingham LLP

(57) ABSTRACT

Herein are computerized techniques for generation, costing/scoring, optimal selection, and reporting of intermediate configurations for a datacenter change plan. In an embodiment, a computer receives a current configuration of a datacenter and a target configuration. New configurations are generated based on the current configuration. A cost function is applied to calculate a cost of each new configuration based on measuring a logical difference between the new configuration and the target configuration. A particular new configuration is selected that has a least cost. When the particular configuration satisfies the target configuration, the datacenter is reconfigured based on the particular configuration. Otherwise, this process is (e.g. iteratively) repeated with the particular configuration instead used as the current configuration. In embodiments, new configurations are randomly, greedily, and/or manually generated. In an embodiment, new configurations obey design invariants that constrain which changes and/or configurations are attainable.

26 Claims, 11 Drawing Sheets

(56) References Cited

U.S. PATENT DOCUMENTS

| | | | |
|---|---|---|---|
| 8,578,269 | B2 | 11/2013 | Osaka |
| 8,732,291 | B2 | 5/2014 | Zhu et al. |
| 8,896,876 | B2 | 11/2014 | Osaka |
| 8,955,112 | B2 | 2/2015 | Nguyen et al. |
| 9,378,461 | B1 | 6/2016 | Chatterjee |
| 9,430,213 | B2 | 8/2016 | Fu et al. |
| 9,667,489 | B2 | 5/2017 | Morris et al. |
| 9,703,890 | B2 | 7/2017 | Kakaraddi et al. |
| 9,720,763 | B2 | 8/2017 | Rajasekharah et al. |
| 10,158,726 | B2 | 12/2018 | Chou et al. |
| 10,185,345 | B2* | 1/2019 | Hanley ............... G05B 15/02 |
| 2009/0326728 | A1* | 12/2009 | Chrisop ............... G06F 1/3203 |
| | | | 700/295 |
| 2010/0010678 | A1* | 1/2010 | Dawson ............ G05D 23/1917 |
| | | | 700/276 |
| 2010/0321574 | A1* | 12/2010 | Kerofsky ............ G09G 3/3611 |
| | | | 348/563 |
| 2011/0289329 | A1* | 11/2011 | Bose .................... G06F 1/329 |
| | | | 713/320 |
| 2011/0302431 | A1* | 12/2011 | Diab ................... G06Q 20/10 |
| | | | 713/310 |
| 2011/0316337 | A1* | 12/2011 | Pelio ................... H05K 7/1497 |
| | | | 307/24 |
| 2012/0005683 | A1* | 1/2012 | Bower, III ........... G06F 9/5094 |
| | | | 718/103 |
| 2012/0016528 | A1* | 1/2012 | Raman ................. G06F 1/3206 |
| | | | 700/291 |
| 2014/0018969 | A1* | 1/2014 | Forbes, Jr. ........... G05B 15/02 |
| | | | 700/295 |
| 2014/0039965 | A1* | 2/2014 | Steven ................. G06Q 10/00 |
| | | | 705/7.25 |
| 2014/0337516 | A1 | 11/2014 | Naseh et al. |
| 2015/0214737 | A1* | 7/2015 | Ichino .................. H02J 3/06 |
| | | | 700/297 |
| 2015/0253795 | A1* | 9/2015 | Saito .................... G06Q 50/06 |
| | | | 700/291 |
| 2016/0370814 | A1* | 12/2016 | Hanley ............... G05B 15/02 |
| 2017/0214273 | A1* | 7/2017 | Kogo ................... H02J 3/005 |
| 2017/0228649 | A1 | 8/2017 | Chatterjee |
| 2017/0295082 | A1 | 10/2017 | Wu |
| 2017/0366428 | A1 | 12/2017 | Shaw et al. |
| 2018/0295154 | A1 | 10/2018 | Crabtree |
| 2019/0041845 | A1 | 2/2019 | Cella |

OTHER PUBLICATIONS

OpenConfig, "Observations on Modelling Configuration and State in YANG", dated Jan. 2018, 17 pages.

NS-3, Network Simulator, "ns-3 Tutorial", ns-3 project, dated Mar. 21, 2018, 127 pages.

Kourtis et al., "Intelligent NIC Queue Management in the Dragonet Network Stack", dated 2015, 15 pages.

Jason Edelman's Blog, "OpenConfig, Data Models, and APIs", http://jedelman.com/home/openconfig-data-models-and-apis/, dated Dec. 21, 2015, 15 pages.

Alvarez Santiago, "Getting Started with OpenConfig", Cisco, dated 2016, 43 pages.

Chatterjee, U.S. Appl. No. 15/192,961, Filed Jun. 24, 2016, Office Action dated Mar. 17, 2020.

Koceberber, U.S. Appl. No. 16/271,535, Filed Feb. 8, 2020, Office Action dated May 13, 2020.

Liu et al., "Cloud Resource Orchestration: A DataCentric Approach", 5th Biennial Conference on Innovative Data Systems Research (CIDR '11) Jan. 2011, Asilomar, California, USA, 8 pages.

Calcaterra et al., "Combining TOSCA and BPMN to Enable Automated Cloud Service Provisioning" dated 2017, 10 pages.

Cisco Public, "Cisco CloudCenter Solution: Architecture Overview", dated 2017, 10 pages.

Cloud Tidbits Column, "Containers and Cloud: From LXC to Docker to Kubernetes", dated Sep. 2014, 4 pages.

Dukaric, "Towards a Unified Taxonomy and Architecture of Cloud Frameworks", Future Generation Computer Systems dated 2013, 5 pages.

Fujitsu, "Fujitsu FlexFrame® Orchestrator V1.1A Solution", Data Sheet, FlexFrame® Orchestrator V1.1A, dated Dec. 15, 2014, 6 pages.

IBM, "IBM Cloud Orchestrator Enterprose Edition Extends Cloud Management Capabilities of IBM Cloud Orchestrator with Integrated Monitoring and Cost Management" dated Dec. 15, 2015, 12 pages.

Katsaros et al., "Cloud application portability with TOSCA, Chef and Openstack", dated Mar. 2014, 9 pages.

Kontena at Github, "The Automated Container Deployment Pipeline", Dated Feb. 9, 2017, 8 pages.

Andrikopoulos et al., "Optimal Distribution of Applications in the Cloud", dated 2014, 6 pages.

Kouchaksaraei et al., "Pishahang: Joint Orchestration of Network Function Chains and Distributed Cloud Applications", dated 2018, 3 pages.

Yamato et al., "Proposal of Optimum Application Deployment Technology for Heterogeneous IaaS Cloud", Proceedings of 2016 6th International Workshop on Computer Science and Engineering, 4 pages.

Octopus Deploy, "Getting Started" https://octopus.com/docs/getting-started, last viewed on Apr. 17, 2019, 8 pages.

Prassanna et al., "A Review of Existing Cloud Automation Tools", dated 2017, 4 pages.

Shalom, Nati, "Orchestration Tool Roundup—Docker Swarm vs. Kubernetes, Terra Form vs. TOSCA/Cloudify vs. Heat", dated Jun. 11, 2015, 9 pages.

Sonata, "D7.5 Market Fesibility Study", dated Jan. 5, 2015, 75 pages.

System Evolution, "Borg, Omega, and Kubernetes", dated 2016, 24 pages.

Varma et al., "Comparative Study of Various Platform As a Service Frameworks", International Journal on Cloud Computing: Services and Architecture (IJCCSA) vol. 6, No. 1, Feb. 2016, 12 pages.

Wettinger et al., "Integrating Configuration Management with Model-driven Cloud Management based on TOSCA", dated 2013, 7 pages.

Yamato et al., "Development of Template Management Technology for Easy Deployment of Virtual Resources on OpenStack", Journal of Cloud Computing: Advances, Systems and Applications dated 2014, 12 pgs.

Kouchaksaraei et al., "Joint Orchestration of Cloud-Based Microservices and Virtual Network Functions", dated Jan. 1, 2018, 2 pages.

\* cited by examiner

AUTOMATED MECHANISMS FOR ENSURING CORRECTNESS OF EVOLVING DATACENTER CONFIGURATIONS

FIELD OF THE INVENTION

The present invention relates to datacenter reconfiguration planning. Herein are techniques for automatic generation, costing/scoring, optimal selection, and reporting of intermediate configurations for a change plan.

BACKGROUND

Maintaining a datacenter over time involves changes in hardware due to replacement, rewiring, and updating the core services like routing and monitoring. Software and/or soft configuration such as property files may also be involved. As a datacenter evolves with these kind of changes, configurations of the various elements in the datacenter need to change with them in appropriate way to maintain the correct behavior and to meet design constraints and application requirements.

Making sure that various elements of datacenters are configured correctly without breaking datacenter-wide functionality can be difficult. For example, a datacenter configuration is multidimensional (i.e. has many choices, alternatives, and adjustable parameters), which may have combinatorics that are more or less intractable if untamed by intelligent heuristics. Currently, changes in a datacenter are managed by taking the following steps:
  1. Planning high-level configuration changes manually based on changes in hardware or policies, using domain experts.
  2. Generating new configurations for each element in the datacenter based on the change plan.
  3. Manually inspecting new configurations for a few datacenter elements.
  4. Rolling out the new configurations in small test-bed and verifying that everything is working by running tests.
  5. Rolling out the new configurations across the datacenter (typically with planned service disruption, and ensuing problem discovery, tracking and fixing in the live production environment).

That approach is challenging for the following reasons:

Process is slow: apart from adding new hardware, planning configuration changes is slow, and progress may be phase gated such as to verify changes, and roll them out across the datacenter.

Interdisciplinary domain expertise required: many experts in different areas of datacenter planning, architecture, maintenance, and monitoring need to work together to plan, test, and roll out the changes.

Complexity: as the scale of the datacenter increases, the complexity of the steps involved also increases. Increased complexity promotes minimizing the scope and frequency of changes to the datacenter. A tendency of avoiding complexity leads to missing many opportunities for optimization which could improve utilization or quality of service.

Error prone: not all failure modes can occur in an experimental deployment, and large scale interaction of various datacenter elements with new configurations can have unexpected consequences.

Disruptive: rolling out these changes typically involves service disruption, at least in parts of the datacenter.

Discourages changes: to avoid errors or downtime, datacenters tend to evolve slowly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are computerized techniques for generation, costing/scoring, optimal selection, and reporting of intermediate configurations for a datacenter change plan. In an embodiment, a computer receives a current configuration of a datacenter and a target configuration. New configurations are generated based on the current configuration. A cost function is applied to calculate a cost of each new configuration based on measuring a logical difference between the new configuration and the target configuration. A particular new configuration is selected that has a least cost. When the particular configuration satisfies the target configuration, the datacenter is reconfigured based on the particular configuration. Otherwise, this process is (e.g. iteratively) repeated with the particular configuration instead used as the current configuration.

In embodiments, new configurations are randomly, greedily, and/or manually generated. In an embodiment, new configurations obey design invariants that constrain which changes and/or configurations are attainable.

In an embodiment, new configurations include a communication topology that is stored as a logical graph in a graph database and amenable to graph analysis such as minimum cut (min-cut) redundant connectivity. In embodiments, new configurations are network traffic simulated to validate conforming behavior and measure performance.

1.0 Example Computer

Figure 1:
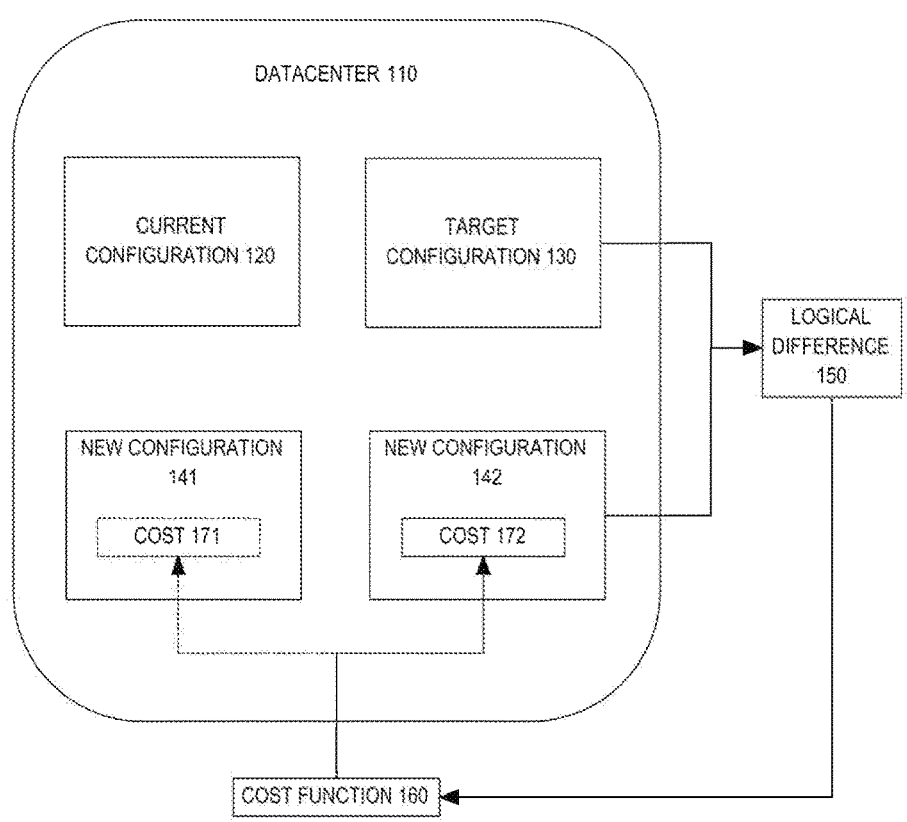
FIG. 1 is a block diagram that depicts an example computer that identifies and calculates costs of new configurations of a datacenter.

FIG. 1 is a block diagram that depicts an example computer 100, in an embodiment. Computer 100 identifies and calculates costs of new configurations of a datacenter. Computer 100 may be one or more of a rack server such as a blade, a personal computer, a mainframe, or other computing device.

Within the memory or other storage of computer 100 are data values and structures representing configurations of a datacenter that contains a network of computers, routers such as switches, and/or storage devices such as disk drives. For example, datacenter 132 may be a data structural model, within memory of computer 100, that represents an operating datacenter. For example, the operating datacenter may contain computer 100.

The equipment of the operating datacenter is meaningfully arranged. Physical arrangement may include which computer cards occupy which slots of which backplanes that are served by which power and network cables, backed up by which universal power supplies (UPSs), and cooled by which fans and ducts. Logical arrangement may include which network interface cards (NICs) join which subnets, over which redundant links, to which network attached storage (NAS) having which redundant array of inexpensive disks (RAID) level.

The operating datacenter may be reconfigured as its workload evolves. For example, a level of service (LoS), such as reliability, availability, or data retention, may be improved by adding capacity of a generalized resource such as volatile or nonvolatile storage or bandwidth of networking or computing. Equipment upgrades may require distributed software upgrades such as a rolling upgrade across a computer cluster. One software upgrade may necessitate other software upgrades within a middleware stack of a computer.

The operating datacenter, as represented within computer 100 as datacenter 110, is currently provisioned according to a configuration that is represented within the memory of computer 100 as current configuration 120, which is a very specific model that captures fine details such as what are the quality and age of cables that are connected to particular ports, what are the central processing unit (CPU) version and core count on a particular computer, what software middleware versions are installed on a particular computer, and how much physical random access memory (RAM) is installed on a particular computer. In an embodiment, current configuration 120 captures additional provisioning data such as which virtual machines (VMs) are hosted by which computers.

Current configuration 120 may include hierarchical data structures that reflect a containment or connectivity hierarchy of physical equipment. For example, a particular rack contains particular server cards such as blades. Current configuration 120 may include associative data structures such as dictionaries or lookup tables that are more or less flattened (i.e. non-hierarchical) to facilitate random access of configuration data for hardware elements. For example, each hardware element may have a unique identifier that may be used as a lookup key. The data structures of current configuration 120 may reside in RAM, in a file, and/or in a database such as a relational database or NoSQL database.

The purpose of reconfiguration of the operating datacenter may be to achieve a desired configuration, such as target configuration 130. Even though target configuration 130 may be more or less based on current configuration 120 and more or less similar to current configuration 120, changes between configurations 120 and 130 may be complicated and extensive. For example, adding disk storage may necessitate re-cabling for power or communication, re-attaining a redundant array of inexpensive disks (RAID) level, installing device driver software, and/or patching software such as a kernel. In an embodiment, target configuration 130 is a complete configuration having details of a same specificity as current configuration 120. In an embodiment, target configuration 130 merely contains additional constraints to impose on current configuration 120, such as an increased storage capacity, and little or no details for achieving that capacity.

No matter how is target configuration 130 expressed, computer 100 may generate new configurations 141-142 that are based on configurations 120 and 130. For example, new configuration 141 may be a hybrid of configurations 120 and 130. For example, new configuration 141 may be based on current configuration 120 and modified to incorporate some or all of target configuration 130. For example, new configuration 141 may be a limited and incremental modification of current configuration 120 that approximates some or all of target configuration 130. In any case, new configurations 141-142 are somewhat different from each other and from current configuration 120 and hopefully somewhat similar to target configuration 130. Strategies for generating new configurations 141-142 are discussed later herein.

New configurations 171-172 are alternative ways to approximate target configuration 130. Computer 100 may more or less simultaneously (e.g. during a same iteration) generate new configurations 141-142 as alternative candidates that either satisfy target configuration 130 or at least more closely approximate target configuration 130 than does current configuration 120. Computer 100 may compare a new configuration, such as 142, to target configuration 130 to detect how different are they, shown as logical difference 150. Logical difference 150 may be quantifiable for various purposes. In one example, two logical differences may be compared to detect which is more different. In another example, quantified logical difference 150 may be a numeric input into a configuration costing function such as 160.

A cost function is a computable expression of priorities for datacenter configuration that facilitates objective comparison between different datacenter configurations based on the priorities. Having encoded desired priorities for datacenter deployment as cost function(s), a search space of all possible configurations for a datacenter can be systematically explored to find an optimal configuration of minimal cost based on priorities encoded in the cost function.

For example, cost function 160 may analyze logical difference 150 to determine cost 172 for new configuration 142. For example, the greater are configurations 130 and 172 mismatched, the greater will be numeric difference 150 and the greater will be numeric cost 172. As discussed later herein, cost function 160 may integrate additional inputs and factors. Thus, cost 172 need not exclusively reflect logical difference 150. For example, cost function 160 may integrate constituent costs such as material availability, material cost, labor cost, downtime or degradation of service, future operating cost (e.g. energy consumption, noise), spatial volume, and/or linear footprint.

Other example costing concerns of cost function(s) include:
- Operating cost savings based on yearly cost (total cost/expected life) of all hardware components of a configuration;
- Power savings based on average power consumption of all hardware components;
- Cooling requirements based on average cooling requirements of all hardware components; and
- Fault tolerance, such as by encoding a datacenter deployment into a logical graph and using a minimum cut of the graph to decrease cost.

Computer 100 may detect which of new configurations 141-142 is better by detecting which of respective costs 171-172 is less. For example, new configuration 142 may be selected because cost 172 is less than cost 171. Computer 100 may select new configuration 142 as a final configuration that sufficiently approximates target configuration 130. For example, computer 100 may provide new configuration 142 to an engineer for adoption and implementation. For example, the engineer may reconfigure datacenter 110 according to new configuration 142. However if new configuration 142, despite being a best new configuration so far, inadequately approximates target configuration 130, then computer 100 may adopt new configuration 142 as a current intermediate configuration from which additional new configurations (not shown) may be generated to better approximate target configuration 130. For example, new configuration 142 may be merely one in a series of monotonically improving intermediate configurations that are each iteratively generated based on a current best configuration of a previous iteration. Thus, computer 100 may iteratively explore a solution space of configurations until target configuration 130 is sufficiently approximated. Techniques for iteratively generating new configurations, measuring differences between new configurations and a target configuration, costing new configurations, and detecting convergence toward the target configuration that is sufficient to cease iterating are presented later herein.

2.0 Example Reconfiguration Process

Figure 2:
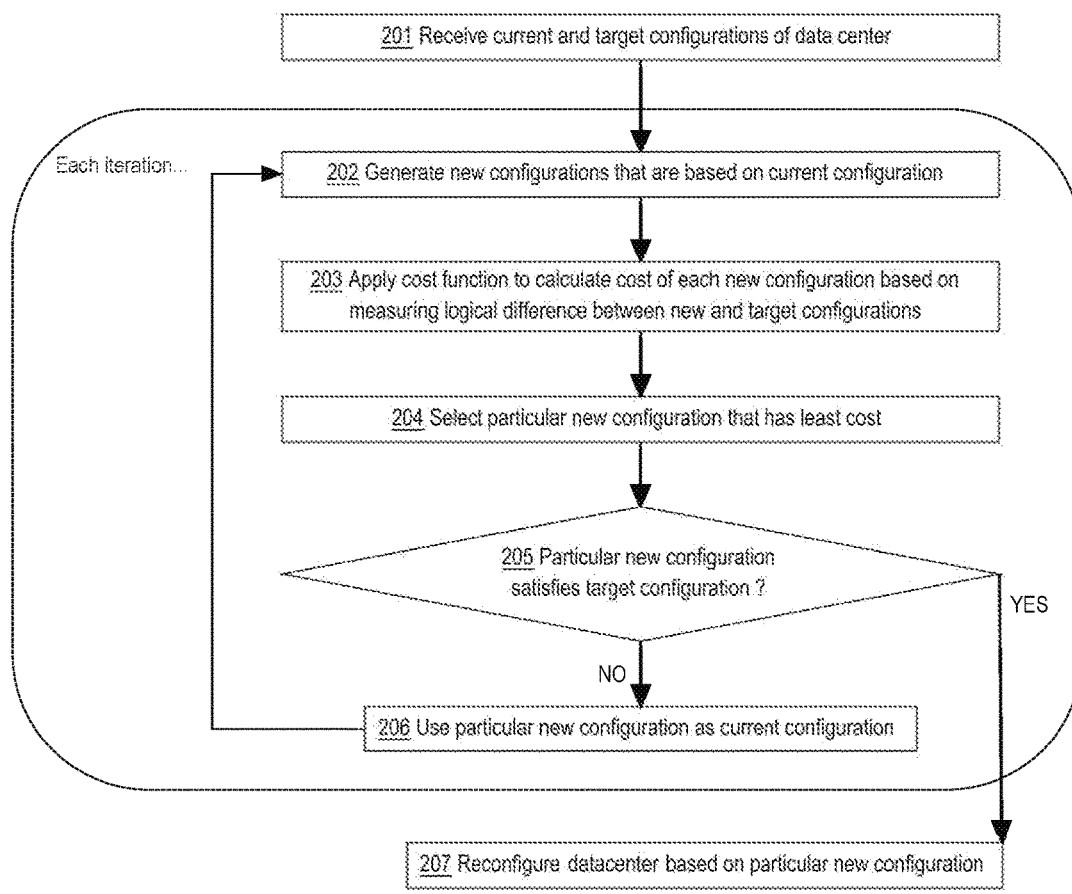
FIG. 2 is a flow diagram that depicts an example computer process for identifying and calculating costs of new configurations of a datacenter.

FIG. 2 is a flow diagram that depicts computer 100 identifying and calculating costs of new configurations of a datacenter, in an embodiment. FIG. 2 is discussed with reference to FIG. 1.

Step 201 is preparatory. Step 201 receives current and target configurations of a datacenter. For example, computer 100 may receive or generate a reconfiguration request for transforming datacenter 110 according to target configuration 130 that may be a more or less detailed configuration or a set of (e.g. application) requirements to satisfy. The reconfiguration request may specify current configuration 120, or computer 100 may directly gather or retrieve current configuration 120, such as from a relational or graph database or from a file.

Computer 100 may iteratively design a series of changes to current configuration 120 that progress toward target configuration 130. Each iteration more or less repeats steps 202-206. Step 202 generates new configurations that are based on the current configuration. For example, new configurations 141-142 are generated as distinct variations to current configuration 120. For example, new configuration may have more or less hardware than current configuration 120.

Step 203 applies a cost function to calculate a cost of each new configuration based on measuring a logical difference between new and target configurations. For example, new configuration 141 may differ from target configuration 130 by logical difference 150 that may list hardware or software mismatches and/or requirements that are unsatisfied by new configuration 141, such as a power consumption limit. Logical difference 150 represents deficiencies of new configuration 141.

A cost function calculates a cost of each new configuration. For example, new configuration 142 has cost 172. Various aspects, such as power consumption, may affect the cost. In an embodiment, a score may be used additionally or instead of a cost. For example, a low cost is better, whereas a high score may be better. For example, a score may indicate how many requirements are satisfied by new configuration 142.

Step 204 selects a particular new configuration that has a least cost or most score, such that the particular configuration is objectively assessed as a best configuration so far towards target configuration 130. For example, new configuration 142 may be selected because cost 172 is less than cost 171.

Step 205 detects when to stop iterating. Specifically, step 205 detects whether or not the particular new configuration satisfies the target configuration. For example, logical difference 150 may be small or empty, which computer 100 may detect, such as by quantifying aspects of logical difference 150, such as with cost function 160 or other logic. If target configuration 130 is satisfied, then iterating may cease, and processing proceeds to step 207. Otherwise, additional reconfiguration by further iterating is needed to better approximate target configuration 130, in which case processing proceeds to step 206 to prepare for another iteration.

Step 206 switches to the particular new configuration for use as the current configuration of a next iteration. For example, new configuration 142 may, for a next iteration, be designated as the current configuration. Across iterations, target configuration 130 is not changed or replaced. After step 206, a next iteration begins by returning to step 202.

Step 207 occurs after iteration ceases because a new configuration converged on the target configuration. The new configuration may be stored, transmitted, and/or reported as discussed later herein. For example, an engineer may reconfigure datacenter 110 according to the particular new configuration, such as 142.

3.0 Design Invariants for a Change Plan

Figure 3:
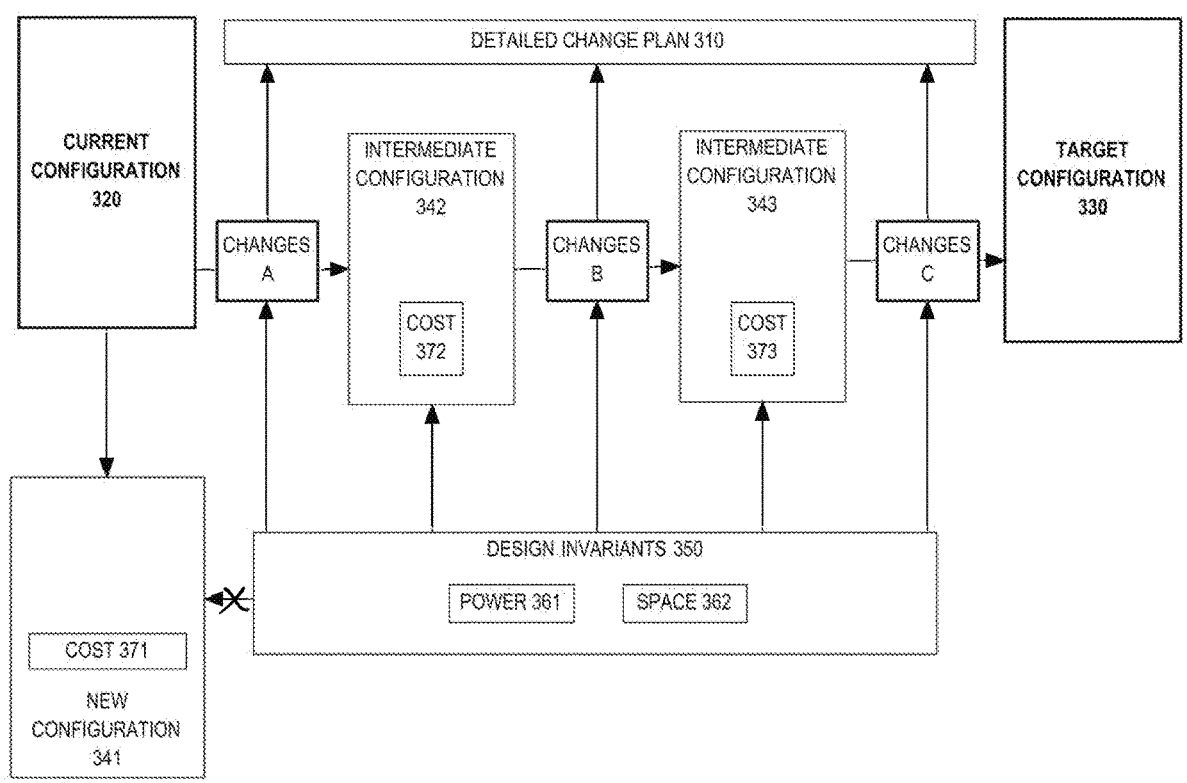
FIG. 3 is a state diagram that depicts an example computer that generates a detailed change plan that obeys design invariants.

FIG. 3 is a block diagram that depicts an example computer 300, in an embodiment. Computer 300 generates a detailed change plan that obeys design invariants. Computer 300 may be an implementation of computer 100.

Computer 300 may have current configuration 320 of a datacenter (not shown) that should be reconfigured to achieve target configuration 330. A series of improving intermediate configurations, such as 342-343, may be generated to analyze a change pathway from current configuration 320 to target configuration 330. Intermediate configurations 342-343 may be necessary for various reasons. One reason may be that computer 300's configuration exploration may be based on making limited incremental changes between intermediate configurations. Another reason may be that an engineer may expect to make incremental changes. In one example, the engineer may apply various tests to intermediate configurations while reconfiguration is in progress. In another example, somewhat operational intermediate configurations may be needed for software patching. Yet another reason may be that monolithic reconfiguration may be too disruptive to end users. For example, fully functional intermediate configurations may be needed to limit a maximum sustained service outage duration. For example, two staggered 10-minute outages may be contractually acceptable. Whereas, a monolithic 15-minute outage may be forbidden.

Thus, there may be various analytic, logistic, or other feasibility reasons why intermediate configurations 342-343 are needed. Such reasons may impose limits on how great may be any one round of changes, such as A, B, or C, between temporally adjacent configurations such as 320, 330, and 342-343. Those limits on changes may be more or less codified and/or enforced as design invariants 350. Design invariants 350 may include absolute limits that are imposed on new configurations. For example, power 361 and space 362 may limit on how much power or spatial volume or floor footprint area may a new configuration consumes. For example if new configuration 341 consumes to much space or power, according to limit 361 or 362, then new configuration 341 may be deemed infeasible and discarded (i.e. not selected for inclusion within a series of selected intermediate configurations).

Likewise, invariants 350 may include differential limits upon changes A-C. For example, if changes B entailed to much of an increase in power or space, then intermediate configuration 343 may be rejected (i.e. discarded in favor of some other configuration not shown). In addition to power 361 and space 362, design invariants 350 may have limits for other dimensions, such as financial cost or downtime as incorporated within calculated costs 371-373. The more limiting is design invariants 350, the more intermediate configurations in series may be needed.

Changes A-C may represent more than mere analytic steps. For example, changes A-C may be significant to an engineer during actual reconfiguration of a datacenter, such as for reasons discussed above. Thus, merely presenting a specification of target configuration 330 to the engineer may be insufficient. The engineer may need detailed instructions as to which changes to make and in what relative ordering. Computer 300 may use any, some, or all of changes A-C and configurations 320, 330, and 342-343 to generate detailed change plan 310 for the engineer to follow to actually migrate the datacenter from current configuration 320 to target configuration 330. Detailed change plan 310 may address cabling for communication and power, ducting for cooling, rack and shelf arrangement, assignment of circuitry cards to backplane slots, physical network topology, software and firmware deployment and configuration, and online access control. Detailed change plan 310 may contain blueprints, schematic drawings, configuration spreadsheets, test plans, reversion contingency plans, and time estimates such as downtime.

4.0 Example Change Planning Process

Figure 4:
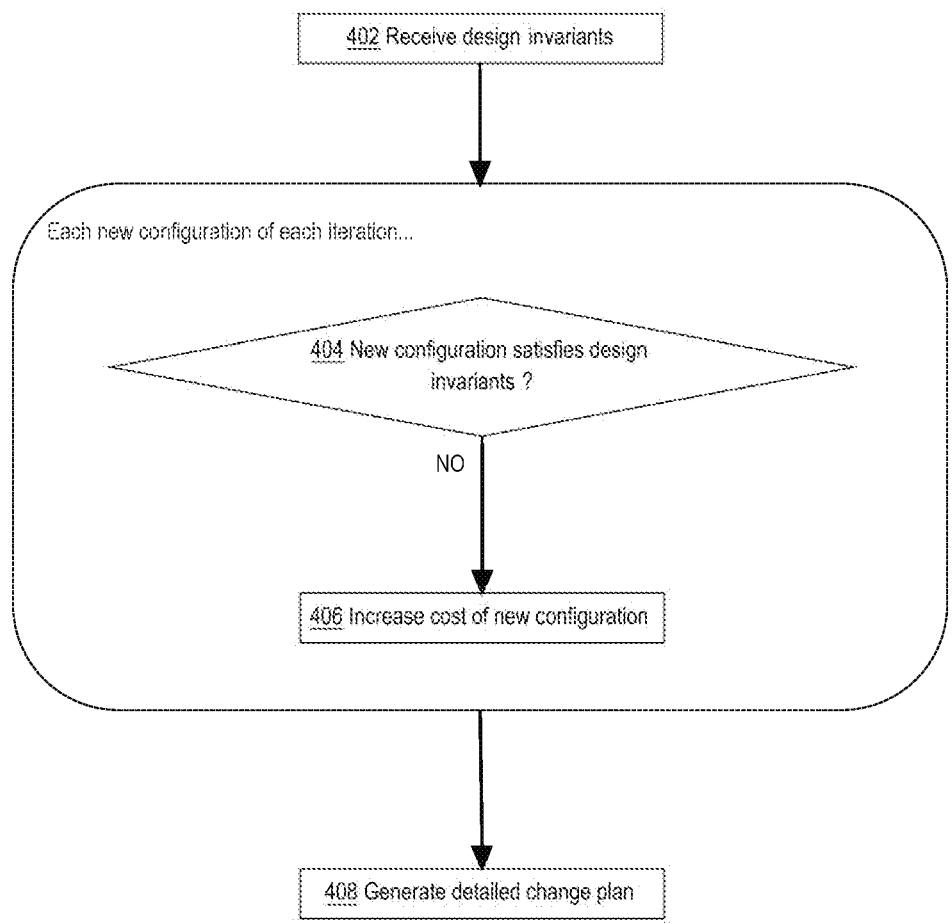
FIG. 4 is a flow diagram that depicts an example computer process for generating a detailed change plan that obeys design invariants.

FIG. 4 is a flow diagram that depicts computer 300 generating a detailed change plan that obeys design invariants, in an embodiment. FIG. 4 is discussed with reference to FIG. 3.

Step 402 is preparatory. Step 402 receives design invariants to impose upon new configurations. For example, computer 300 receives a request to reconfigure a datacenter according to target configuration 330. Responsive to the request, design invariants 350 are retrieved or otherwise received. Some or all of design invariants 350 may defined or expressly referenced in the reconfiguration request. For example, the request may require a particular RAID level. Some or all of design invariants 350 may be independent of any request. For example, computer 300 may have locally stored reusable invariants as always applicable during reconfiguration planning. For example, reusable invariants may specify how much space does a datacenter have.

Step 404 is repeated for each new configuration that is generated during each iteration. Step 404 detects whether or not the new configuration satisfies the design invariants. For example, computer 300 may detect that intermediate configuration 342 satisfies design invariants 350. If the new configuration does not satisfy design invariants 350, then step 406 is applied to the new configuration.

Step 406 imposes a penalty upon the nonconforming configuration by increasing the calculated cost of that configuration. For example, upon detection that new configuration 341 needs more space than 362 allows, then cost 371 is significantly increased to discourage selection of nonconforming configuration 341 to be a next current configuration. Violation of design invariants 350 need not disqualify a nonconforming configuration outright. The numeric penalty may nonetheless let the nonconforming configuration be promoted as the next current configuration as a last resort, such as when all new configurations of a current iteration are nonconforming.

Eventually, iteration ceases upon detecting that a new configuration sufficiently approximates target configuration 330. Each iteration generated and selected an intermediate configuration that is based on a respective set of changes. These intermediate configurations and their change sets occur in a series that may be more or less necessary to convey to an engineer. Step 408 generates a detailed change plan from the series of configurations and changes. For example, detailed change plan 310 more or less reports changes A-C and/or intermediate configurations 342-343 in a more or less step by step recipe of instructions to incrementally reconfigure the datacenter to achieve target configuration 330. Detailed change plan 310 may also include a manifest of new equipment to install, tools needed, and/or staff roles needed, such that resources may be acquired before reconfiguring the datacenter.

5.0 Greedy Planning

Figure 5:
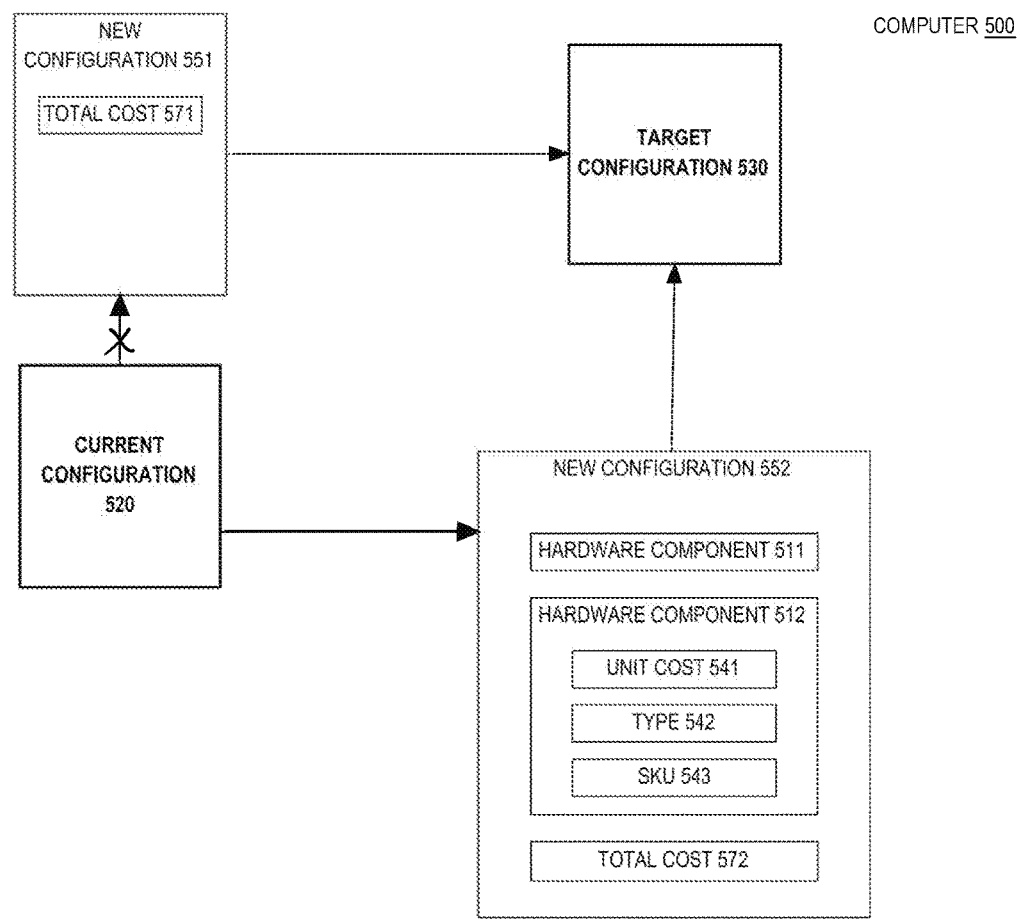
FIG. 5 is a block diagram that depicts a computer that explores a configuration space based on feasibility, heuristics, and various costs.

FIG. 5 is a block diagram that depicts an example computer 500, in an embodiment. Computer 500 explores a configuration space based on feasibility, heuristics, and various costs. Computer 500 may be an implementation of computer 100.

Computer 500 may generate a change plan (not shown) to evolve a datacenter (not shown) from current configuration 520 to target configuration 530. Current configuration 520 may be an initial configuration of the datacenter, or an intermediate configuration while computer 500 performs a greedy (i.e. least cost) depth first search (DFS) to discover an inexpensive path (i.e. series) of intermediate configurations from current configurate 520 to target configuration 530. DFS occurs as follows.

Each of configurations 520, 530, and 551-552 may be vertices of a logical graph. In the graph, an edge is shown as an arrow connecting two configurations that represents the difference between the two configurations, as a set of configuration changes. As the DFS traverses from current configuration 520 to a neighboring configuration, neighbors are generated and costed, and a least expensive neighbor is selected as a next intermediate configuration to become a next current configuration of the greedy traversal toward target configuration 530.

Heuristics for generating intermediate configurations should accommodate various scenarios. For example, sometimes all possible paths to target configuration 530 have intermediate configurations that are nonoperational (i.e. broken), such that a service outage is unavoidable. Computer 500 should not always discard broken intermediate configurations. In an embodiment, total cost 571 is greatly increased, if new configuration 551 is nonoperational, to discourage broken intermediate configurations except as a last resort. Although penalized, different broken configurations may have (e.g. slightly) different total costs.

A malfunctioning configuration is not the only aberrant kind of intermediate configuration that may be tolerated. There may be various reasons for infeasibility of a new configuration. In an embodiment, various forms of infeasibility may have a same or respective cost penalties. Other forms of infeasibility include exceeding a limit on space, planar footprint, wattage, monetary budget, or cooling capacity.

Other heuristics to calculate a cost for an intermediate configuration are as follows. A major driver of (e.g. operational and/or capital) cost is complexity. In an embodiment, configuration cost is increased based on a count of hardware elements, components, or other replaceable hardware units. For example, new configuration 552 contains hardware components 511-512, such as cables, ducts, backplanes, and computers. An increased count of hardware units and/or types (e.g. 542) of hardware may increase total cost 572.

Each hardware component may have a unit cost, such as 541, that may depend on constituent costs such as purchase price, consumption of power and/or space, operating cost, installation (e.g. labor, downtime) cost, failure rate, availability such as shipping duration, or other metrics to minimize. Unit cost 541 may be a single integrated scalar, or various independent scalars for constituent costs. In addition to or instead of type 542, hardware component 512 may have stock keeping unit (SKU) 543, such as a unique text string. The following example Python cost function is based on a count of unique SKUs.

```
def sku_cost_function(configuration):
    skus_list = get_all_skus(configuration)
    unique_skus_list = unique(skus_list)
    cost = len (unique_skus_list)
    return cost
```

6.0 Graph Topology

Figure 6:
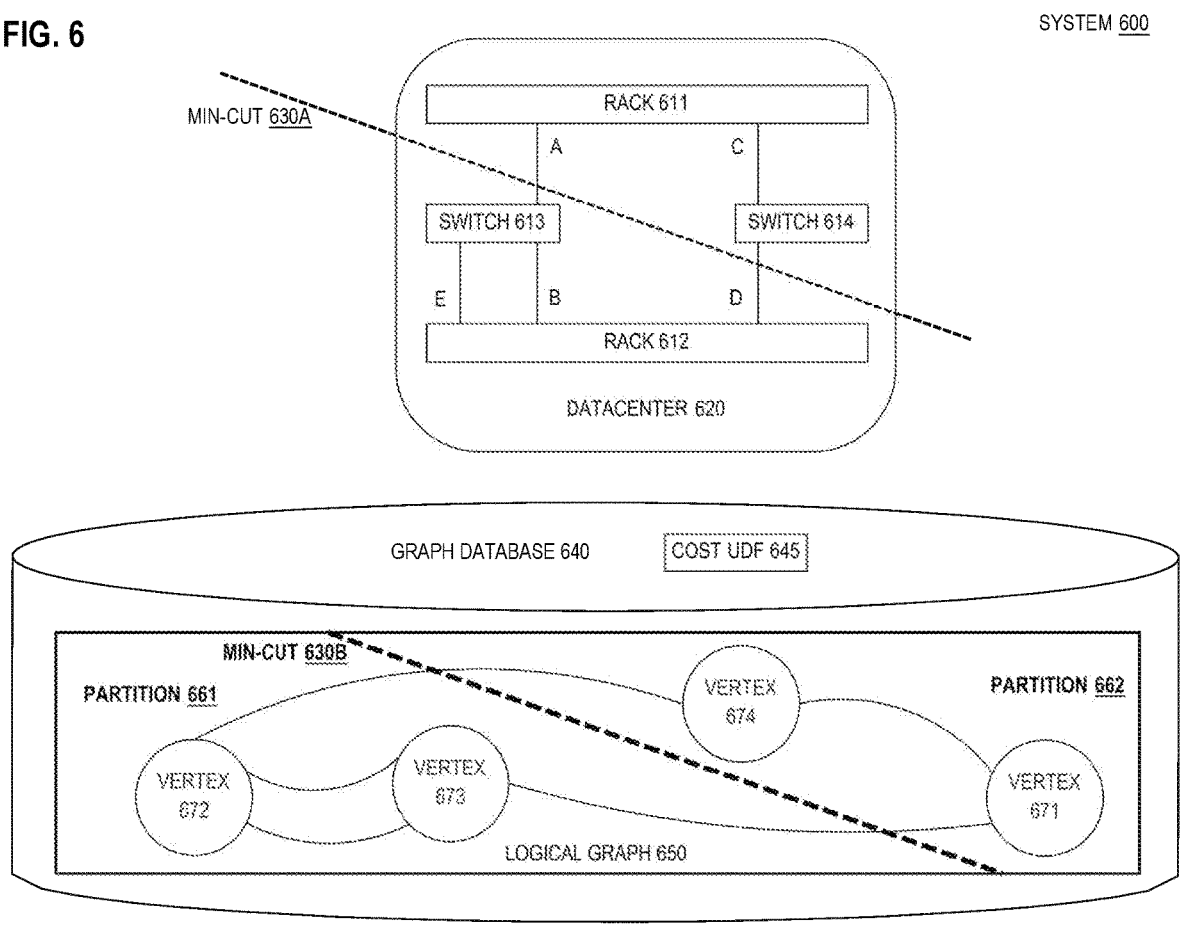
FIG. 6 is a block diagram that depicts an example system that fosters redundancy to increase reliability.

FIG. 6 is a block diagram that depicts an example system 600, in an embodiment. System 600 fosters redundancy to increase reliability. System 600 contains a computer (not shown) that may be an implementation of computer 100.

System 600 may configure datacenter 620 that has a communication topology that spans computer racks 611-612 and network switches 613-614, all of which are interconnected by data cables A-E. Data cables A-E are redundant such that removal during reconfiguration or failure in operation of any two cables still allows racks 611-612 to communicate, so long as the two cables removed are not A and either C or D. For example, removing cables A-B or C-D does not prevent communication between racks 611-612.

Removing cables A and either C or D is a minimum amount of removed cables that will halt communication between racks 611-612, which is a minimum cutting (min-cut) of two cables to cause an outage, shown as min-cut 630A. If datacenter 620 is to be made more reliable, then a target configuration (not shown) may specify a min-cut greater than two, such as three. In that case, new configurations may score better that have a higher min-cut. Although only min-cut 630A between racks 611-6121 is shown, datacenter 620 may have a target configuration that specifies multiple hardware components that need redundant communication paths. Thus, additional min-cuts may also be involved with reconfiguration scoring.

Min-cut is a classic problem for graphs and readily calculated by a graph database system. A configuration planning computer (not shown) may use graph database 640 to store, clone, modify, score, analyze, and compare logical graphs, such as 650, that each represents a configuration of a datacenter such as 620. Vertices 671-674 may represent hardware elements 611-614 and may be divided between partitions 661-662, such as by min-cut 630B.

A graph database system may execute analytic queries (not shown), such as a query that scores or costs a configuration/graph. Defined within graph database 640 may be reusable user defined function(s) (UDF) that can cost or score a graph such as 650 and that can be invoked by a query. For example, cost UDF 645 may have complicated logic encoded as SQL, JavaScript, Java bytecode, or other language for scripting or programming for extension, embedding, or general purpose. For example, cost UDF 645 may be encoded in a graph query language or a domain specific language (DSL).

If graph database 640 is replicated for horizontal scaling, then reconfiguration planning may be accelerated, which may facilitate generation and evaluation of more candidate configurations to more thoroughly explore the solution space, which may lead to a better (e.g. high score or low cost) final configuration, which is an improved technological result. Horizontal scaling may generate either an improved result in some time, or an adequate result in less time.

In an embodiment, an open source framework such as OpenConfig.net may automate capture of an existing configuration of a datacenter. OpenConfig is a consortium of third party vendors that provide telemetry tools for automatically discovering and recording a configuration and topology of a datacenter or other network. In an embodiment, environmental and infrastructural details discovered by OpenConfig are transformed and stored into a graph such as 650 within graph database 640. For example, initial graph 650 need not be manually created.

7.0 Compound Cost

Figure 7:
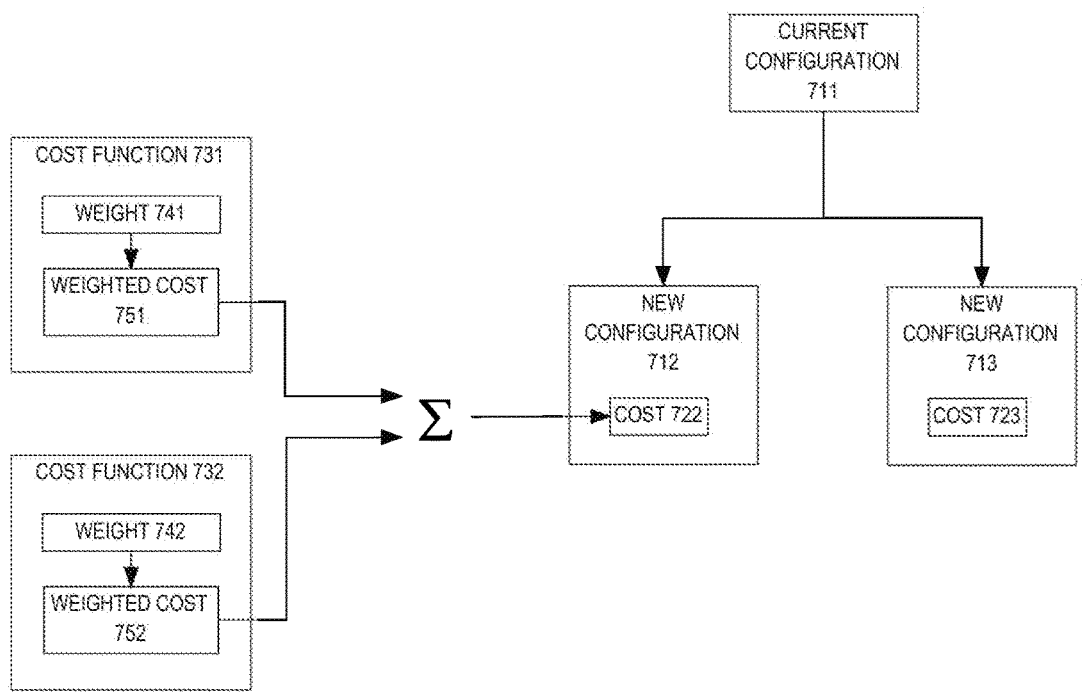
FIG. 7 is a block diagram that depicts an example computer that reconfigures based on concerns of varied importance.

FIG. 7 is a block diagram that depicts an example computer 700, in an embodiment. Computer 700 reconfigures based on concerns of varied importance. Computer 700 may be an implementation of computer 100.

Computer 700 has multiple cost functions 731-732 that contribute to total cost 722 of new configuration 712. Each cost function calculates a cost of a respective dimension(s) such as electrical wattage or spatial volume. Because wattage and volume need not be equally important, each cost function has its own weighting factor that reflects the relative importance of the cost function. For example, cost function 731 has weight 741, such that any cost that is calculated by cost function 731 is further multiplied by weight 741 to yield weighted cost 751. Weighted costs 751-752 may be combined in meaningful ways such as into an arithmetic sum, arithmetic mean, or geometric mean to calculate a total cost such as 722. An example Python cost weighting function is as follows.

```
def composite_cost_evaluator(configuration,
    composite_costs_list):
        total_cost = 0
        for cost_function, weight in composite_costs_list:
            total_cost = total_cost + (weight *
cost_function(configuration))
        return total_cost
```

Computer 500 may generate a change plan (not shown) to evolve a datacenter (not shown) from current configuration 520 to target configuration 530. Current configuration 520 may be an initial configuration of the datacenter, or an intermediate configuration while computer 500 performs a greedy (i.e. least cost) depth first search (DFS) to discover an inexpensive path (i.e. series) of intermediate configurations from current configuration 520 to target configuration 530. DFS occurs as follows.

Generation of new configurations 712-713 is implementation dependent. An engineer may manually design some or all of new configurations 712-713, which is slow and error prone, but may leverage expertise and imagination to achieve optimality.

Computer 700 may have a reusable vocabulary of basic changes that may be applied to quickly generate some or all of new configurations 712-713. For example, a hardware or software element may be added, removed, scaled up or down (i.e. replaced with a better or worse substitute), replicated (e.g. scaled horizontally), or moved to another rack, shelf, slot, or port. For example, a virtual machine may be moved to another host computer.

In an embodiment, one or more basic changes (to current configuration 711) are randomly selected to generate new configuration 712. A random change may be less likely to be a direct improvement (i.e. toward a target configuration), but may be more likely to be an indirect improvement by escaping a greedy local optimum.

In an embodiment, basic changes are not random, but are instead selected for greedy searching. For example if current configuration 711 is too slow, then a computer 700 may have a heuristic to increase a cache size by increasing volatile memory. Computer 700 may have many rules to propose basic changes. Rules may be biased (e.g. prioritized) to prefer some basic changes over others. For example, moving or reconfiguring software may be favored over moving or adding hardware. Embodiments may generate some new configurations greedily, some randomly, and/or some manually.

Biases of rules may be contradictory. For example, one rule may move a virtual machine to a least loaded computer, and another rule may move the virtual machine to a most loaded computer. Rules may have conditions to manage contradictions or otherwise limit context. For example, one rule may move a virtual machine to a most loaded computer if a count of computers of a current configuration exceeds that of a target configuration to consolidate hardware. Whereas, an unbiased rule may move the virtual machine to a computer selected at random.

8.0 Simulation

Figure 8:
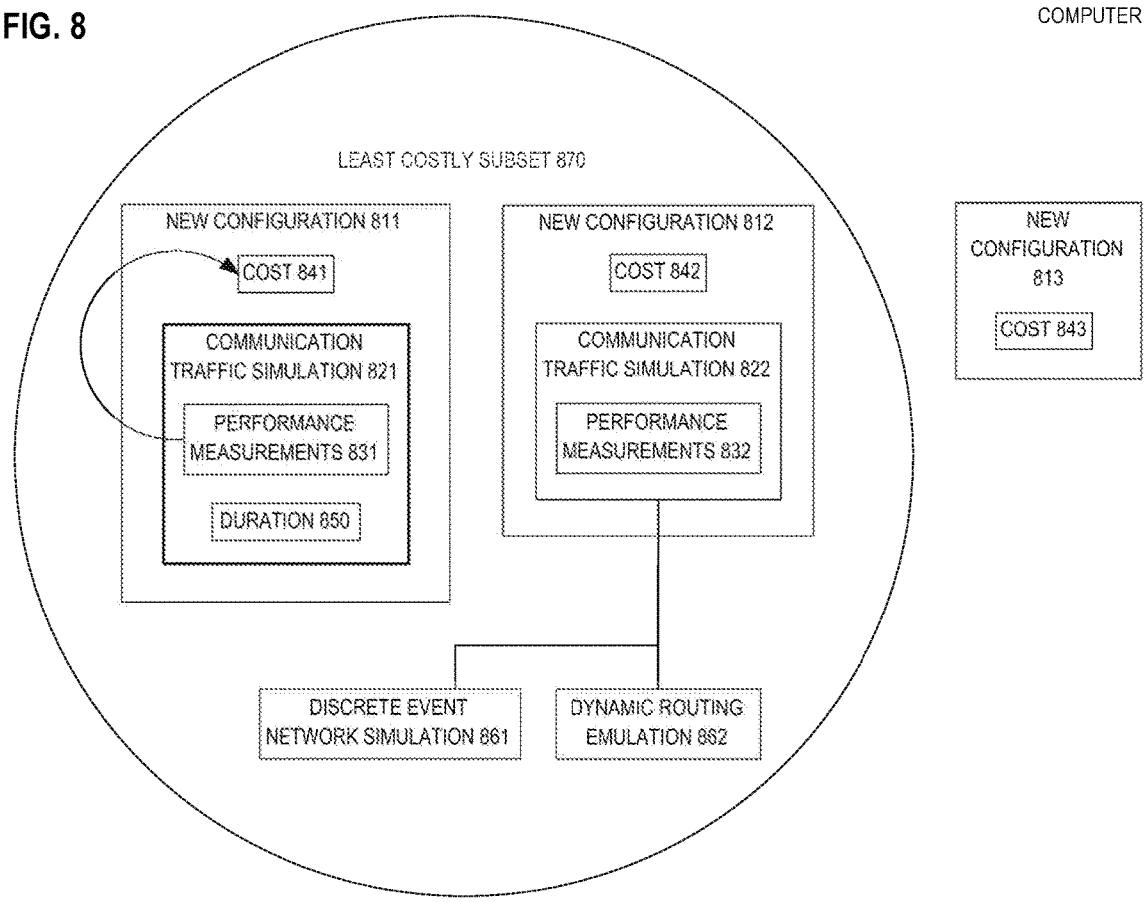
FIG. 8 is a block diagram that depicts an example computer that costs and/or validates configurations based on performance simulations.

FIG. 8 is a block diagram that depicts an example computer 800, in an embodiment. Computer 800 costs and/or validates configurations based on performance simulations. Computer 800 may be an implementation of computer 100.

Above, only static costing is discussed, such that a new configuration can be scored based solely on passive analysis (e.g. mathematics) of the new configuration and perhaps the current configuration and/or the target configuration. Such passive analysis may miss lower order and/or emergent effects that may impact operational performance if the new configuration is actually implemented in a datacenter. For example, potential throughput (i.e. time consumption) and wattage (i.e. energy consumption) may not be amenable to accurate prediction by mathematic formulae.

Performance simulation of the new configuration may more or less accurately reveal a performance potential of a new configuration. For example, communication traffic simulation 821 may perform high level simulation of expected communication patterns within new configuration 811 as a logical network topology, such as with discrete event network simulation 861 that may trace transfers, messages, or even packets as they flow along precise paths through store and forward switching fabric. During simulation 821, performance measurements 831 may be observed for communication aspects such as average and largest backlog (e.g. buffer consumption).

Simulation may be computationally expensive and thus slow. For example, simulations 811-812 may execute until a fixed amount of traffic has flowed, or a fixed amount of simulated (i.e. virtual) time has elapsed, or a fixed amount of real (i.e. wall clock or system) time has elapsed such as duration 850. With horizontal scaling such as with a computer cluster, multiple simulations 821-822 may concurrently run to accelerate aggregate costing. Horizontal scale may be important for more intensive forms of simulation that are more accurate, such as dynamic routing emulation 862 that executes production software that is intended for embedding in network switches.

In an embodiment, network simulation 861 and emulation 862 cooperate. For example, virtual machines may be hosted by a cluster of computers, including computer 800, and each switch instance may be emulated by its own virtual machine in the cluster. Network simulation 861 may dynamically decide traffic routes, including which switches relay which packets. Based on that routing, emulation 862 configures each emulated switch, subjects the switch to traffic as generated by network simulation 861, and detects how accurately and quickly does the switch relay packets. For example, discrete event network simulation 861 may assume that redundant links (e.g. cables, ports), are always load balanced, which may be an oversimplification that dynamic routing emulation 862 overcomes. Thus, dynamic routing emulation 862 is better at pinpointing congestion hotspots.

Because simulation is expensive, simulation may be somewhat decoupled from static costing. In an embodiment, after costing, simulation occurs as a binary pass/fail test to merely validate that a new configuration is operational (i.e. will not malfunction). In an embodiment, costing occurs in two phases, which are a static costing phase followed by a simulation scoring phase whose measured score can be used to discriminate between two new configurations that are both fully operational but have different (i.e. more or less desirable) performance characteristics.

Whether initial simulation results will be binary or numeric, between the two phases, a best subset having a fixed count of new configurations with best costs may be selected. For example, the fixed count may be two, and costs 841-842 may be a best two costs, and cost 843 is not as good. Thus, new configurations 811-812 are included in least costly subset 870, and new configuration 813 is excluded. In the simulation costing phase, only new configurations in least costly subset 870 are simulation scored. A final score or cost may be a combination of scores from both phases for a new configuration. A new configuration with a best final score may be selected as a next current configuration.

9.0 Cloud Federation

Figure 9:
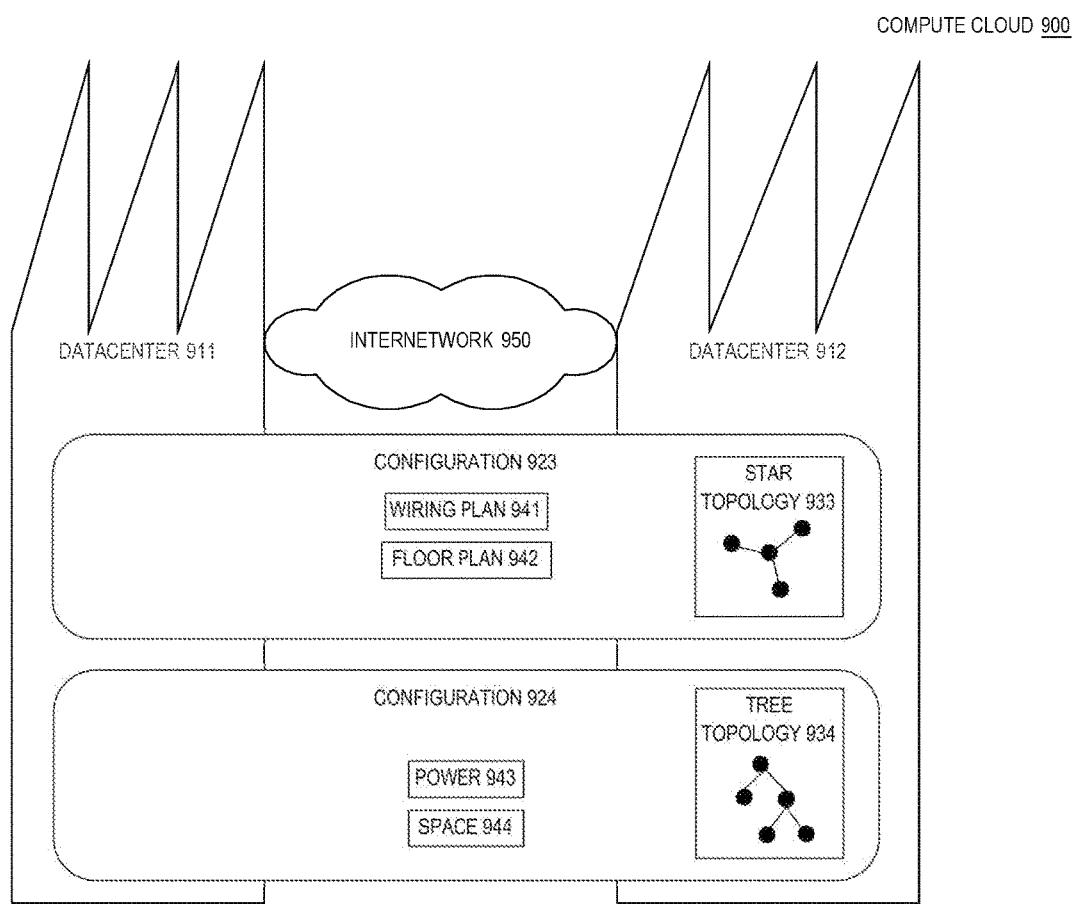
FIG. 9 is a block diagram that depicts an example cloud that is reconfigurable, including multiple datacenters that are connected by an internetwork such as the global Internet.

FIG. 9 is a block diagram that depicts an example compute cloud 900, in an embodiment. Compute cloud 900 is reconfigurable, which involves its multiple datacenters 911-912 that are connected by internetwork 950 such as the global Internet.

Reconfiguration of cloud 900 may entail adopting a cohesive multisite configuration, such as 923-924, that spans multiple datacenters. Although internetwork 950 is incorporated into cloud 900, a configuration plan shown not expect to reconfigure internetwork 950. In other words, internetwork 950 may impose design (e.g. interface) constraints upon datacenters 911-912 that remain unchanged across all generated new configurations 923-924. Likewise, datacenters 911-912 may each have its own design constraints. For example, datacenter 911 may have more space than datacenter 912.

Each multisite configuration may be scored on various dimensions such as consumption metrics such as power 943 and space 944 that may have various impacts during generation of wiring plan 941 for power and/or communication and floor plan 942 for rack and shelf assignments. In an embodiment not shown, separate (i.e. more or less independent) configurations are generated for each of datacenters 911-912. In the shown embodiment, each configuration comprehensively spans both of datacenters 911-912, which is not to say that both of datacenters 911-912 are similarly configured to each other. An advantage of automatic and global configuration planning is that one datacenter may be reconfigured in response to changed circumstances in another federated datacenter. For example, datacenter 911 may onboard a large new enterprise customer, with an impact that will or already has cascaded to datacenter 912. Thus, datacenter 912 individually or cloud 900 globally may be automatically reconfigured, either reactively or proactively.

Compute cloud 900 may conform to a connectivity topology for communication, such as topologies 933-934 that are more or less regular, hierarchical, and symmetric, such as within datacenter 911 individually and/or spanning both datacenters 911-912. An embodiment may have configuration generation heuristics that may select topological patterns such as from a library of templates. Topologies such as star 933 and (e.g. fat) tree 934 may be generally favored for performance characteristics or by convention, which does not connote universal suitability. Based on configuration requirements, an ad hoc topology (not shown) may have better performance or cost. An embodiment may rely on localized (e.g. peephole, limited radius) configuration changes to achieve an optimal ad hoc configuration without bias toward an overarching topology or architecture.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
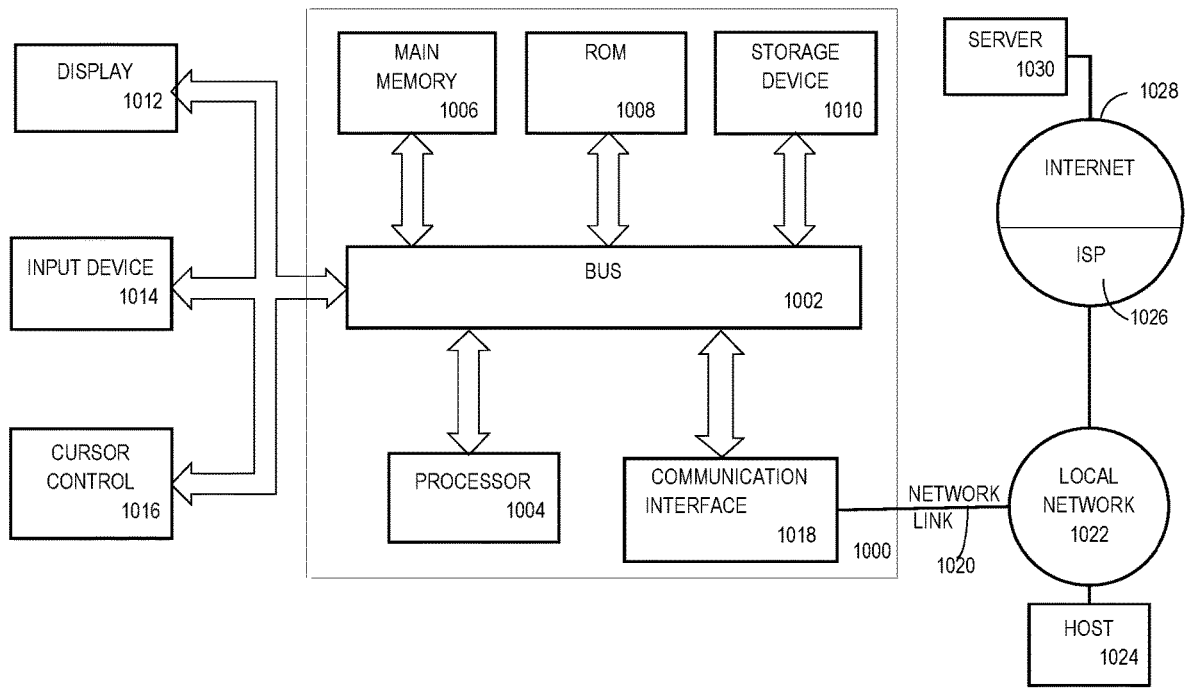
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

11.0 Software Overview

Figure 11:
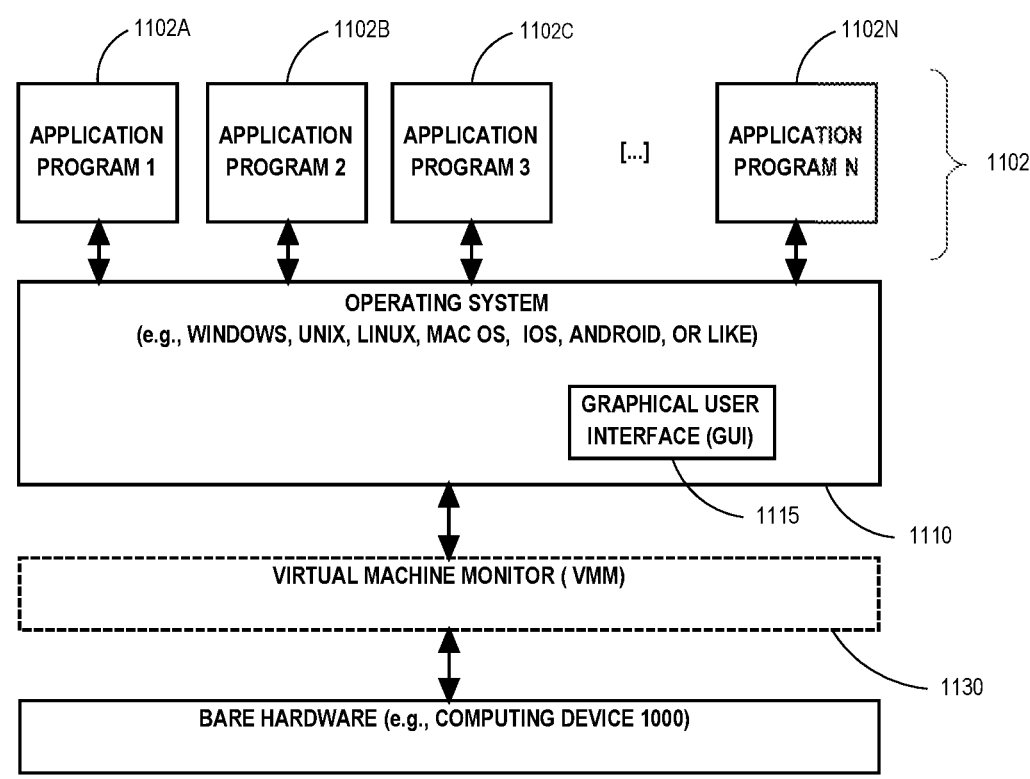
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 106, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 106 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

12.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving a current configuration of a datacenter and a target configuration of said datacenter;
  generating a plurality of new configurations of said datacenter that are based on said current configuration;
  applying a cost function to calculate a cost of each configuration of said plurality of new configurations based on: a) measuring a logical difference between said each configuration and said target configuration and b) at least one factor selected from the group consisting of:
    a capital cost of hardware elements that are required by said each configuration,
    a count of types of hardware elements that are required by said each configuration,
    a count of distinct stock keeping units (SKUs) of hardware elements that are required by said each configuration,
    a count of redundant communication paths between hardware elements that are achieved by said each configuration, and
    an amount of space that is required by said each configuration;
  selecting a particular configuration of said plurality of new configurations that has a least cost;
  when the particular configuration satisfies said target configuration, reconfiguring said datacenter based on said particular configuration;
  when the particular configuration does not satisfy said target configuration, repeating said method with said particular configuration as said current configuration and with said target configuration;
  wherein the method is performed by one or more computers.

2. A method comprising:
  receiving a current configuration of a datacenter and a target configuration of said datacenter;

receiving design invariants to impose upon a plurality of new configurations of said datacenter that are based on said current configuration, wherein said plurality of new configurations comprises a first configuration that satisfies said design invariants and a second configuration that does not satisfy said design invariants;

generating said plurality of new configurations of said datacenter;

applying a cost function to calculate a cost of each configuration of said plurality of new configurations based on measuring a logical difference between said each configuration and said target configuration;

increasing said cost of said second configuration based on detecting that said second configuration that does not satisfy said design invariants;

selecting a particular configuration of said plurality of new configurations that has a least cost and comprises selecting said first configuration based on said increasing said cost of said second configuration;

when the particular configuration satisfies said target configuration, reconfiguring said datacenter based on said particular configuration;

when the particular configuration does not satisfy said target configuration, repeating said method with said particular configuration as said current configuration and with said target configuration;

wherein the method is performed by one or more computers.

3. The method of claim 2 wherein:
the method further comprises generating a detailed change plan for achieving said reconfiguring;
said detailed change plan comprises a sequence of intermediate configurations;
each configuration of said sequence of intermediate configurations satisfies said design invariants.

4. The method of claim 2 wherein said design invariants constrain at least one resource selected from the group consisting form the group of: power, and space.

5. A method comprising:
receiving a current configuration of a datacenter and a target configuration of said datacenter;
generating a plurality of new configurations of said datacenter that are based on said current configuration, wherein said plurality of new configurations comprises a particular configuration that passes a simulation test and a second configuration that fails said simulation test;
applying a cost function to calculate a cost of each configuration of said plurality of new configurations based on measuring a logical difference between said each configuration and said target configuration;
increasing said cost of said second configuration based on detecting that said second configuration fails said simulation test;
selecting said particular configuration based on said increasing said cost of said second configuration;
when the particular configuration satisfies said target configuration, reconfiguring said datacenter based on said particular configuration;
when the particular configuration does not satisfy said target configuration, repeating said method with said particular configuration as said current configuration and with said target configuration;
wherein the method is performed by one or more computers.

6. The method of claim 1 wherein said plurality of new configurations are further based on said target configuration.

7. The method of claim 1 wherein said current configuration contains a wiring plan.

8. A method comprising:
receiving a current configuration of a datacenter and a target configuration of said datacenter;
generating a plurality of new configurations of said datacenter that are based on said current configuration;
applying a cost function to calculate a cost of each configuration of said plurality of new configurations based on measuring a logical difference between said each configuration and said target configuration, wherein vertices of a logical graph are associated with respective hardware elements of said each configuration;
increasing said cost of said each configuration based on a count of communication links in a minimum cut that divides said logical graph into two partitions of similar size;
selecting a particular configuration of said plurality of new configurations that has a least cost;
when the particular configuration satisfies said target configuration, reconfiguring said datacenter based on said particular configuration;
when the particular configuration does not satisfy said target configuration, repeating said method with said particular configuration as said current configuration and with said target configuration;
wherein the method is performed by one or more computers.

9. The method of claim 8 further comprising storing said logical graph into a graph database.

10. The method of claim 9 wherein applying said cost function comprises applying a user defined function (UDF) that is defined in said graph database.

11. A method comprising:
receiving a current configuration of a datacenter and a target configuration of said datacenter;
generating a plurality of new configurations of said datacenter that are based on said current configuration, wherein said plurality of new configurations comprises a first configuration and a second configuration that is more similar to said current configuration than is said first configuration to said current configuration;
applying a cost function to calculate a cost of each configuration of said plurality of new configurations based on measuring a logical difference between said each configuration and said target configuration, wherein a cost of said first configuration exceeds a cost of said second configuration;
selecting a particular configuration of said plurality of new configurations that has a least cost;
when the particular configuration satisfies said target configuration, reconfiguring said datacenter based on said particular configuration;
when the particular configuration does not satisfy said target configuration, repeating said method with said particular configuration as said current configuration and with said target configuration;
wherein the method is performed by one or more computers.

12. The method of claim 1 wherein:
said applying said cost function comprises applying a plurality of cost functions that includes said cost function;
said calculate said cost of said each configuration comprises calculating a weighted cost for each cost function of said plurality of cost functions.

13. The method of claim 1 wherein said generating said plurality of new configurations comprises:
   manually generating a first configuration, and
   randomly generating a second configuration.

14. A method comprising:
   receiving a current configuration of a datacenter and a target configuration of said datacenter;
   generating a plurality of new configurations of said datacenter that are based on said current configuration;
   applying a cost function to calculate a cost of each configuration of said plurality of new configurations based on measuring a logical difference between said each configuration and said target configuration;
   identifying a fixed size subset of said plurality of new configurations that have less costs than other configurations of said plurality of new configurations;
   adjusting said costs of said fixed size subset of configurations based on performance measurements of simulated communication traffic in said fixed size subset;
   selecting a particular configuration of said plurality of new configurations that has a least cost;
   when the particular configuration satisfies said target configuration, reconfiguring said datacenter based on said particular configuration;
   when the particular configuration does not satisfy said target configuration, repeating said method with said particular configuration as said current configuration and with said target configuration;
   wherein the method is performed by one or more computers.

15. The method of claim 14 wherein said simulated communication traffic comprises at least one activity selected from the group consisting of:
   discrete event network simulation, and
   dynamic routing by one or more hardware elements of a configuration of said fixed size subset.

16. The method of claim 14 wherein said simulated communication traffic occurs for a particular real duration.

17. A method comprising:
   receiving a) a current configuration that spans a first datacenter and a second datacenter and b) a target configuration of said first datacenter and said second datacenter, wherein a compute cloud contains said first datacenter and said second datacenter;
   generating a plurality of new configurations of said first datacenter and said second datacenter that are based on said current configuration;
   applying a cost function to calculate a cost of each configuration of said plurality of new configurations based on measuring a logical difference between said each configuration and said target configuration;
   selecting a particular configuration of said plurality of new configurations that has a least cost;
   when the particular configuration satisfies said target configuration, reconfiguring said first datacenter and said second datacenter based on said particular configuration;
   when the particular configuration does not satisfy said target configuration, repeating said method with said particular configuration as said current configuration and with said target configuration;
   wherein the method is performed by one or more computers.

18. The method of claim 1 wherein
   the method further comprises generating a detailed change plan for achieving said reconfiguring.

19. The method of claim 18 wherein said detailed change plan comprises a sequence of intermediate configurations.

20. One or more non-transient computer-readable media storing instructions that, when executed by one or more processors, cause performance of:
   receiving a current configuration of a datacenter and a target configuration of said datacenter;
   generating a plurality of new configurations of said datacenter that are based on said current configuration;
   applying a cost function to calculate a cost of each configuration of said plurality of new configurations based on: a) measuring a logical difference between said each configuration and said target configuration and b) at least one factor selected from the group consisting of:
      a capital cost of hardware elements that are required by said each configuration,
      a count of types of hardware elements that are required by said each configuration,
      a count of distinct stock keeping units (SKUs) of hardware elements that are required by said each configuration,
      a count of redundant communication paths between hardware elements that are achieved by said each configuration, and
      an amount of space that is required by said each configuration;
   selecting a particular configuration of said plurality of new configurations that has a least cost;
   when the particular configuration satisfies said target configuration, reconfiguring said datacenter based on said particular configuration;
   when the particular configuration does not satisfy said target configuration, repeating said performance with said particular configuration as said current configuration and with said target configuration.

21. One or more non-transient computer-readable media storing instructions that, when executed by one or more processors, cause performance of:
   receiving a current configuration of a datacenter and a target configuration of said datacenter;
   receiving design invariants to impose upon a plurality of new configurations of said datacenter that are based on said current configuration, wherein said plurality of new configurations comprises a first configuration that satisfies said design invariants and a second configuration that does not satisfy said design invariants;
   generating said plurality of new configurations of said datacenter;
   applying a cost function to calculate a cost of each configuration of said plurality of new configurations based on measuring a logical difference between said each configuration and said target configuration;
   increasing said cost of said second configuration based on detecting that said second configuration that does not satisfy said design invariants;
   selecting a particular configuration of said plurality of new configurations that has a least cost and comprises selecting said first configuration based on said increasing said cost of said second configuration;
   when the particular configuration satisfies said target configuration, reconfiguring said datacenter based on said particular configuration;
   when the particular configuration does not satisfy said target configuration, repeating said performance with said particular configuration as said current configuration and with said target configuration.

22. One or more non-transient computer-readable media storing instructions that, when executed by one or more processors, cause performance of:
- receiving a current configuration of a datacenter and a target configuration of said datacenter;
- generating a plurality of new configurations of said datacenter that are based on said current configuration, wherein said plurality of new configurations comprises a particular configuration that passes a simulation test and a second configuration that fails said simulation test;
- applying a cost function to calculate a cost of each configuration of said plurality of new configurations based on measuring a logical difference between said each configuration and said target configuration;
- increasing said cost of said second configuration based on detecting that said second configuration fails said simulation test;
- selecting said particular configuration based on said increasing said cost of said second configuration;
- when the particular configuration satisfies said target configuration, reconfiguring said datacenter based on said particular configuration;
- when the particular configuration does not satisfy said target configuration, repeating said performance with said particular configuration as said current configuration and with said target configuration.

23. One or more non-transient computer-readable media storing instructions that, when executed by one or more processors, cause performance of:
- receiving a current configuration of a datacenter and a target configuration of said datacenter;
- generating a plurality of new configurations of said datacenter that are based on said current configuration;
- applying a cost function to calculate a cost of each configuration of said plurality of new configurations based on measuring a logical difference between said each configuration and said target configuration, wherein vertices of a logical graph are associated with respective hardware elements of said each configuration;
- increasing said cost of said each configuration based on a count of communication links in a minimum cut that divides said logical graph into two partitions of similar size;
- selecting a particular configuration of said plurality of new configurations that has a least cost;
- when the particular configuration satisfies said target configuration, reconfiguring said datacenter based on said particular configuration;
- when the particular configuration does not satisfy said target configuration, repeating said performance with said particular configuration as said current configuration and with said target configuration.

24. One or more non-transient computer-readable media storing instructions that, when executed by one or more processors, cause performance of:
- receiving a current configuration of a datacenter and a target configuration of said datacenter;
- generating a plurality of new configurations of said datacenter that are based on said current configuration, wherein said plurality of new configurations comprises a first configuration and a second configuration that is more similar to said current configuration than is said first configuration to said current configuration;
- applying a cost function to calculate a cost of each configuration of said plurality of new configurations based on measuring a logical difference between said each configuration and said target configuration, wherein a cost of said first configuration exceeds a cost of said second configuration;
- selecting a particular configuration of said plurality of new configurations that has a least cost;
- when the particular configuration satisfies said target configuration, reconfiguring said datacenter based on said particular configuration;
- when the particular configuration does not satisfy said target configuration, repeating said performance with said particular configuration as said current configuration and with said target configuration.

25. One or more non-transient computer-readable media storing instructions that, when executed by one or more processors, cause performance of:
- receiving a current configuration of a datacenter and a target configuration of said datacenter;
- generating a plurality of new configurations of said datacenter that are based on said current configuration;
- applying a cost function to calculate a cost of each configuration of said plurality of new configurations based on measuring a logical difference between said each configuration and said target configuration;
- identifying a fixed size subset of said plurality of new configurations that have less costs than other configurations of said plurality of new configurations;
- adjusting said costs of said fixed size subset of configurations based on performance measurements of simulated communication traffic in said fixed size subset;
- selecting a particular configuration of said plurality of new configurations that has a least cost;
- when the particular configuration satisfies said target configuration, reconfiguring said datacenter based on said particular configuration;
- when the particular configuration does not satisfy said target configuration, repeating said performance with said particular configuration as said current configuration and with said target configuration.

26. One or more non-transient computer-readable media storing instructions that, when executed by one or more processors, cause performance of:
- receiving a) a current configuration that spans a first datacenter and a second datacenter and b) a target configuration of said first datacenter and said second datacenter, wherein a compute cloud contains said first datacenter and said second datacenter;
- generating a plurality of new configurations of said first datacenter and said second datacenter that are based on said current configuration;
- applying a cost function to calculate a cost of each configuration of said plurality of new configurations based on measuring a logical difference between said each configuration and said target configuration;
- selecting a particular configuration of said plurality of new configurations that has a least cost;
- when the particular configuration satisfies said target configuration, reconfiguring said first datacenter and said second datacenter based on said particular configuration;
- when the particular configuration does not satisfy said target configuration, repeating said performance with said particular configuration as said current configuration and with said target configuration.

* * * * *

UNITED STATES PATENT AND TRADEMARK OFFICE
CERTIFICATE OF CORRECTION

PATENT NO. : 10,795,690 B2  
APPLICATION NO. : 16/174582  
DATED : October 6, 2020  
INVENTOR(S) : Shinde et al.

Page 1 of 1

It is certified that error appears in the above-identified patent and that said Letters Patent is hereby corrected as shown below:

On the Title Page

On page 2, Column 2, Item (56) under Other Publications, Line 20, delete "Enterprose" and insert -- Enterprise --, therefor.

On page 2, Column 2, Item (56) under Other Publications, Line 44, delete "Fesibility" and insert -- Feasibility --, therefor.

In the Claims

In Column 19, Line 38, in Claim 4, after "consisting" delete "form the group".

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*